US012163347B2

(12) United States Patent
Bailey et al.

(10) Patent No.: US 12,163,347 B2
(45) Date of Patent: Dec. 10, 2024

(54) APPARATUS AND METHODS FOR REMEDIATION OF FLOODWATER-DAMAGE

(71) Applicant: Blue Core Technologies, LLC, Yellow Springs, OH (US)

(72) Inventors: Kyle Bailey, McKinney, TX (US); Jason Bailey, Plano, TX (US)

(73) Assignee: Blue Core Technologies, LLC, Yellow Springs, OH (US)

( * ) Notice: Subject to any disclaimer, the term of this patent is extended or adjusted under 35 U.S.C. 154(b) by 868 days.

(21) Appl. No.: 17/217,893

(22) Filed: Mar. 30, 2021

(65) Prior Publication Data

US 2021/0301545 A1 Sep. 30, 2021

Related U.S. Application Data

(60) Provisional application No. 63/002,566, filed on Mar. 31, 2020.

(51) Int. Cl.

| | |
|---|---|
| ***E04G 23/00*** | (2006.01) |
| ***C11D 3/00*** | (2006.01) |
| ***C11D 3/395*** | (2006.01) |
| ***C11D 3/48*** | (2006.01) |
| ***C11D 17/00*** | (2006.01) |

(52) U.S. Cl.
CPC ............ *E04G 23/00* (2013.01); *C11D 3/0068* (2013.01); *C11D 3/3953* (2013.01); *C11D 3/3956* (2013.01); *C11D 3/48* (2013.01); *C11D 17/0043* (2013.01)

(58) Field of Classification Search
CPC ....... E04G 23/00; E04G 23/004; E04G 23/02; E04G 23/0292; C11D 3/0068; C11D 3/3953; C11D 3/3956; C11D 3/48; C11D 3/395; C11D 3/43; C11D 17/0043; C11D 17/0047
See application file for complete search history.

(56) References Cited

U.S. PATENT DOCUMENTS 5,155,924 A * 10/1992 Smith .................. E04B 1/7092
15/DIG. 7
8,272,143 B1 * 9/2012 Hedman .................. A61L 2/10
422/1

(Continued)

*Primary Examiner* — Chi Q Nguyen
(74) *Attorney, Agent, or Firm* — Stephen Y. Liu; Carstens, Allen & Gourley, LLP

(57) ABSTRACT

Methods and apparatus for remediating buildings damaged by floodwaters. The methods include removing floodwater-damaged wall cladding to expose underlying structure. Applying under pressure a chemical composition to remove malodor and that penetrates into the underlying structure. Then, allowing a powdery surface coating to form on surfaces of the underlying structure. Useful apparatus includes a container configured to contain a liquid phase of a chemical composition and a pressurized gas canister associated with the container for supplying gas under pressure to a fluid conduit extending from an inlet of the container to an outlet of the container. The apparatus can include a venturi in a flowpath of the fluid conduit which suctions a chemical composition in the container into the fluid conduit for expulsion from the outlet of the container and into a high pressure spray delivery hose.

10 Claims, 5 Drawing Sheets

(56) References Cited

U.S. PATENT DOCUMENTS

| | | | | |
|---|---|---|---|---|
| 8,297,015 | B2 * | 10/2012 | Martin | E04B 1/7092 52/302.1 |
| 8,468,716 | B1 * | 6/2013 | Walker | E04B 1/7092 34/235 |
| 9,169,636 | B2 * | 10/2015 | Blank | E04B 1/7023 |
| 9,169,663 | B1 * | 10/2015 | Moss | E04G 23/002 |
| 9,945,612 | B2 * | 4/2018 | Lundberg | B63B 71/00 |
| 9,989,307 | B2 * | 6/2018 | Storrer | F26B 21/00 |
| 10,053,879 | B1 * | 8/2018 | Wagoner | E04G 23/002 |
| 10,060,641 | B2 * | 8/2018 | Burton | F24F 7/025 |
| 10,639,537 | B2 * | 5/2020 | Kiraly | A63B 69/3658 |
| 10,780,463 | B1 * | 9/2020 | Lukin | B08B 3/106 |
| 11,686,482 | B2 * | 6/2023 | Burton | E04D 15/00 52/302.1 |

* cited by examiner

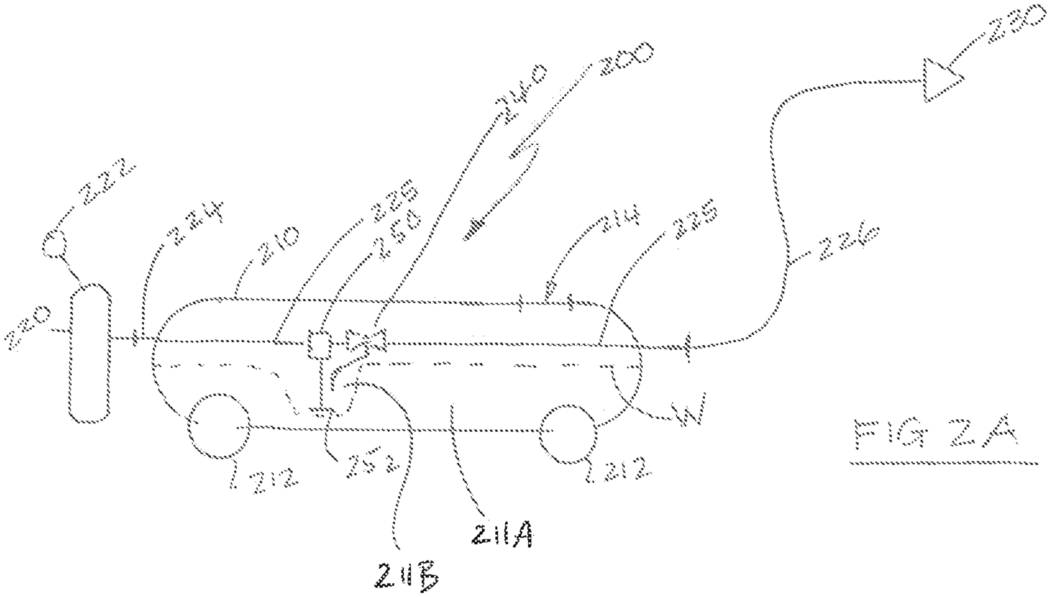
FIG 2A
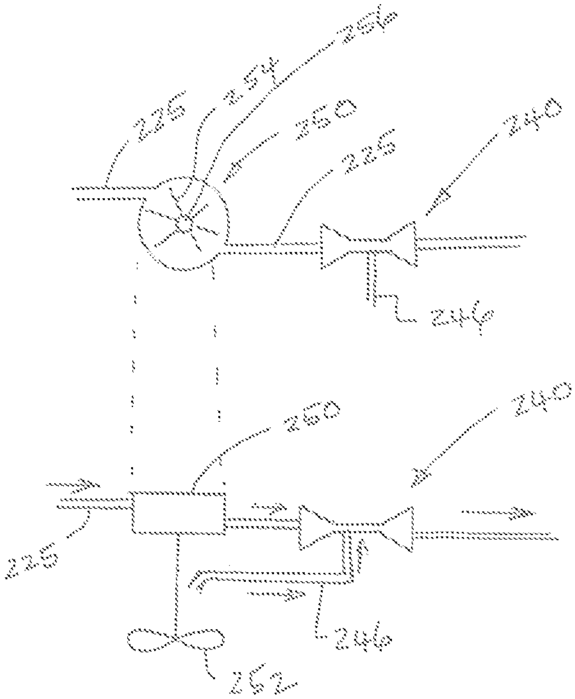
FIG 2B
FIG 2C

APPARATUS AND METHODS FOR REMEDIATION OF FLOODWATER-DAMAGE

CROSS-REFERENCE TO RELATED APPLICATION(S) AND CLAIM OF PRIORITY

This application claims priority under 35 U.S.C. § 119(d) to U.S. Provisional Patent Application No. 63/002,566 filed on Mar. 31, 2020. The above-identified provisional patent application is hereby incorporated by reference in its entirety.

BACKGROUND

1. Field of the Invention

The invention relates to the remediation of floodwater damaged premises, whether residential, commercial or industrial through treatment after floodwaters have receded with a chemical spray applied under pressure to remediate or prevent the proliferation of biological organisms, such as mold and fungi, to remediate malodors and to sanitize.

2. Description of the Related Art

With the increasing cost of remediation of floodwater damage, regardless of whether attributed to unusual weather conditions, such as "global warming" also known as "climate change," there has been renewed attention to the issue of how to effectively remediate floodwater-damaged homes, commercial buildings, and industrial buildings. Regardless of the cause of the flooding, whether climate change or urban concrete sprawl or other factors, the cost has escalated due to both rising costs and the wide-spread extent of damage.

In general, floodwaters are heavily contaminated and may include not only fecal matter from sewers and waste from storm drains, but also toxic materials that are picked up through flooding such as heavy metals, hydrocarbon oils, pesticides, and a wide range of other materials. This dirty floodwater enters homes, offices, and other buildings and continues to rise to a level in the building until the floodwaters recede. The damaged areas include the floors and all areas up to the high-water mark of the flood, and beyond because over time water seeps upward to formerly dry areas, above the high-water mark, to contaminate these as well.

In general, remediation has focused on first removing any water contaminated and damaged material, such as drywall and insulation. Once removed, hot air blowers are deployed to dry out the materials within the walls (i.e. the material contained behind the drywall in the wall structure, such as the wood supports and the insulating material, if any. Hot air blowers are run continuously, day and night, to dry out the flood contaminated area, and are stopped only when an acceptable amount of residual moisture is detected. An anti-microbial/fungicide is applied as a final step. The remediation is carried out subject to regulations and oversight of several Federal Agencies, and their state counterparts, in many states. These agencies include the Environmental Protection Agency, the Food and Drug Administration, Occupational Safety and Health Organization, among others. The purpose is to provide at least some control over safety of the workers engaged in the remediation effort, and to provide at least some control to provide habitable premises to people that are not so contaminated as to be a health hazard.

SUMMARY

This summary is intended to present a brief outline of some of the features of exemplary embodiments of the inventions; these and additional features are more particularly described in the Detailed Description, here below. The descriptions do not limit the scope on the inventions, which is set forth in the appended patent claims.

There is provided an exemplary method of remediating buildings damaged by floodwaters. The method includes removing floodwater-damaged wall cladding to expose underlying structure. Once the underlying structure is exposed, a chemical composition that removes malodor and that may penetrate into pores of porous underlying structure is applied under pressure. The chemical composition may speed up the drying out process of the previously floodwater soaked structural materials. After chemical application, drying allows a powdery surface coating to form on the underlying structure to which the chemical composition was applied. This coating acts to prevent microbial growth, such as bacteria and molds.

There is also provided an exemplary apparatus for remediating buildings contaminated with floodwater. The apparatus may be carried on the back, as a backpack for example, or in larger versions the apparatus may be wheeled. The apparatus includes a container configured to contain a liquid phase of a chemical composition. The container also includes a fluid conduit extending from an inlet to an outlet. A pressurized gas canister, which is fluidically connected to the inlet of the container, supplies a pressurized gas. A venturi in a flowpath of the fluid conduit of the container is configured to suction at least one of the liquid phase of the chemical composition or a gaseous phase of the chemical composition into the fluid conduit for expulsion at the outlet of the container. The apparatus also includes a hose in communication with the outlet of the container, the hose having a flow control nozzle attached to an end thereof.

There is provided another exemplary method of remediating buildings damaged by floodwaters, the method including the steps of at least partially filling a container with a liquid phase of a chemical composition that releases a gaseous phase of the chemical composition. The container includes a fluid conduit extending from an inlet to an outlet and a venturi is disposed in a flowpath of the fluid conduit. The method also includes the step of providing, from a pressurized gas canister, a pressurized gas to the inlet of the container. The pressurized gas is configured to cause the venturi to suction at least one of the liquid phase of the chemical composition or the gaseous phase of the chemical composition into the fluid conduit for expulsion at the outlet of the container. A flow control nozzle, connected to the container by a hose, is then directed to control expulsion of the at least one of the liquid phase or the gaseous phase of the chemical composition into an environment. The chemical composition removes malodor from the environment.

BRIEF DESCRIPTION OF THE DRAWINGS

The foregoing aspects and many of the attendant advantages of the present technology will become more readily appreciated by reference to the following Detailed Description, when taken in conjunction with the accompanying simplified drawings of exemplary embodiments. The drawings, briefly described here below, are not to scale, are presented for ease of explanation and do not limit the scope of the inventions recited in the accompanying patent claims.

FIG. 2A is a schematic diagram of another exemplary embodiment of the apparatus for remediating floodwater damaged buildings in accordance with an illustrative embodiment.

FIG. 2B is a schematic top view illustration, sectioned to illustrate gas driver internals, and a venturi in the embodiment of FIG. 2A.

FIG. 2C is a schematic side view to illustrate the gas driver, the impeller, and the venturi of the embodiment of FIG. 2A.

DETAILED DESCRIPTION

Figure 1A:
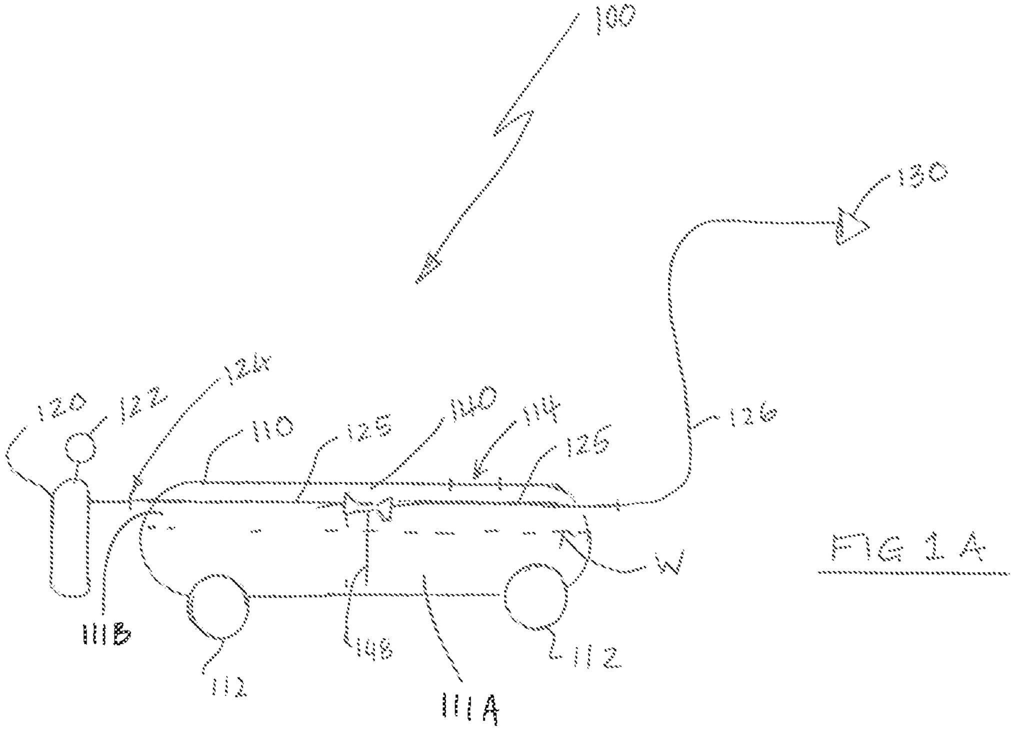
FIG. 1A is a schematic diagram of an exemplary embodiment of the apparatus for remediating floodwater damaged buildings in accordance with an illustrative embodiment.

The following non-limiting detailed descriptions of examples of embodiments of the inventions may refer to appended Figure drawings and are not limited to the drawings, which are merely presented for enhancing explanations of features of the technology. In addition, these detailed descriptions may refer to terms of art, some of which are defined herein, as appropriate and necessary for clarity, and others of which are clear to persons of ordinary skill in the art.

The term "building" as used in the specification and claims refer, without limitation to all residential, commercial and industrial/manufacturing structures, including without limitation to structures such as homes, hotels, office buildings and the like.

The term "coating" or "coat" is used in reference to a powdery residue on surfaces treated with the present remediation technology gaseous cleaning agent on surfaces, and is by its nature not necessarily a continuous coating but one that is powdery and may have gaps and that may flake off by rubbing on it.

The phrase "damaged by floodwaters" means that the material has been contacted by floodwaters and is to at least some extent wetted or soaked by the floodwaters so that remediation is required. While drywall, for example, that was underwater is removed, and not remediated, the structural material behind the drywall, such as wooden supports in residences, can be remediated. It is an initial judgment by the salvage professional to determine what must be removed and disposed of, and what can be remediated, albeit having been contacted and contaminated by floodwater.

The present technology applies a chemical composition to surfaces of structures in buildings that have been damaged by floodwaters. The technology is applied immediately, or as soon as possible after, flood waters have receded, and after removal of structure that is so damaged that it cannot be recovered. For example, drywall that has been underwater for a long time and that is structurally weakened as well as contaminated. The technology is preferably applied before the application of drying heat. The application of drying heat using hot air blowers is common and conventional and appears to be the present preferred operation of commercial remediators. It has been found, surprisingly, that the use of the present technology without first using hot air for drying, leads to a better outcome, with less risk of microbial contamination (mold/fungal/bacterial), than is often found with the conventional hot air blow dry methods presently in commercial use.

In general, the present technology uses a chemical composition that when brought into contact with water releases a gas that has properties that include an antimicrobial function, i.e., the gas kills mold, fungi, and bacteria as well as viruses. In an exemplary embodiment, the chemical composition releases a chlorine-containing gas, such as chlorine dioxide ($ClO_2$).

In an exemplary and non-limiting embodiment, a tablet or gel pack that when brought into contact with water releases a gas (in this case chlorine dioxide) that has properties that include an antimicrobial function, may include the following components: magnesium sulfate; sodium chloride; sodium chlorite; sodium sulfate; and sodium bisulfate. A scent to assist in temporary amelioration malodors may be added. While useful proportions of each component might range widely, as long as the composition generates a useful volume of chlorine dioxide at a useful rate of generation for remediation, sodium chloride may be in the range from about 20 to about 35 wt. %; magnesium sulfate may be in the range from about 15 to about 35 wt. %; sodium chlorite may be in the range from about 10 to about 20 wt. %; and sodium bisulfate from about 3 to about 15 wt. %.

In a non-limiting example, in order to make a 50 gallon batch of cleaning chemical composition, a container is filled with about 200 liters of water (room temperature) and ten 20 g tablets are dissolved into water. Then about 6 liters of household ammonia is added and then the solution is agitated. A premixed fragrance liquid (comprised of for example Lavender Oil, Clean Cotton Fragrance and/or Glycerin) can be optionally added during the agitation process. Agitation is continued until the mixture turns from yellow to milky white/clear. This final milky white/clear solution can then be used by applying under pressure to surfaces in the remediation procedure.

In other embodiments, a tablet or gel pack could include a composition that generates other gasses than chlorine dioxide that are anti-microbial and/or anti-fungal, such as sulfur dioxide.

The apparatus that is useful in carrying out the remediation process includes several embodiments that are advantageously free of any electrical motors and are driven by a combination of gas power from high pressure gas and principles of fluid dynamics. Thus, some of the apparatus merely require a pressurized gas canister to pressurize and deliver the chemical composition. Others employ a venturi to suction the chemical composition into a line leading to a delivery hose. Yet other embodiments have an internal gas-driven impeller that creates a vortex in a liquid chemical composition to release an airborne spray that includes the cleaning gas and suctions that spray mixture into a venturi and directs it to a delivery hose. Of course, as with any remediation process, safety precautions should be taken by those persons using the apparatus and applying the methods taught herein.

According to the present technology, the delay in addressing contamination by floodwaters is avoided, and outcomes in terms of reduced risk of contamination are improved. Once the affected floodwater soaked/wetted outer drywall structure has been removed, and the cleaning chemical composition applied, air may be circulated to facilitate remediation. The air need not be hot air—in many cases power is disrupted—but air circulation may be useful to facilitate drying of the cleaning composition onto the sprayed surfaces leaving behind a powdery coating. It is theorized without being bound that the powdery coating is hygroscopic and draws residual moisture out of the surface pores so that the desired residual humidity (dictated by local ordinances) is more rapidly achieved, while also deterring microbial growth.

Figure 1B:
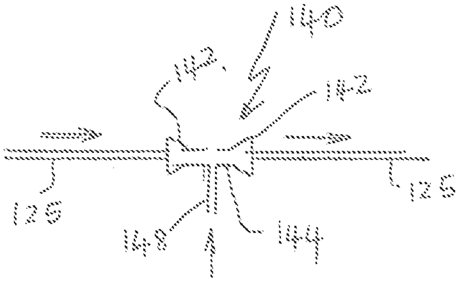
FIG. 1B is a schematic of an exemplary embodiment of a venturi used in connection with the apparatus of FIG. 1A.

Referring to FIGS. 1A, and B, the illustrated schematic example shows an apparatus 100 that includes a container 110 configured to hold therein a cleaning chemical composition, including both liquid and gaseous phases (111A and 111B). The cleaning chemical composition includes a tablet/gel pack inserted via portal 114 into the container 110 that may be filled at least partially with water up to the water line W, before or after tablet/gel pack insertion. In the illustrated version, the container 110 is wheeled (112, 112) to accommodate large volumes of cleaning chemical composition, although this is not necessary in all applications. A gas canister 120 that may be equipped, in this example, with a pressure gauge 122 or another type of gauge to assess the quantity of gas inside. The gas canister 120 may be clipped or otherwise fastened to the container 110 for ease of use. A line (conduit carrying a fluid) 124 extends from the gas canister 120 and connects to a header 125 that extends all the way from the inlet to the outlet of container 110. Gas flows in the line 124 to line 125 which includes a venturi 140. The venturi illustrated in more detail in FIG. 1B, has opposed ends 142 with a reduced diameter portion 144 between. Thus, gas flowing in line 125 through the venturi generates a suction that draws the chemical composition up through line 148 into the flowing gas stream. A judicious sizing of the relative diameters of the venturi (ends 142 and central zone 144) and line 148 ensures a desired rate of flow of the chemical composition into line 125, and thence to the delivery hose 126, preferably a chemical resistant flexible hose. The quantity of the gas-conveyed chemical composition is controlled at nozzle 130, by the operator. Thus, the region above the water line W is gas filled and the entire container is pressurized.

In another embodiment 200, illustrated schematically in FIGS. 2A, B and C, the apparatus includes an impeller 252 in addition to the venturi 240. Here, the impeller 252, driven by a gas-driven turbine 250, is run at such speed as to generate a vortex in the container 110, as illustrated by the shape of the liquid-gas interface W in FIG. 2A. Here, the gas from canister 220 (with gauge 222) flows into line 224 and thence to line 225 that extends right through the container 210. Again, the container may be wheeled, 212. A tablet or gel pack is inserted via the portal 214 into the container having water therein.

Referring to FIG. 2B, the top view showing the internals of gas-driver 250 shows vanes extending radially from the axis 256 to cause them to rotate around the axis. In FIG. 2C the axis 256 is connected to a rod that extends to an impeller 252. The impeller is rotated at such speed in concert with the axis as to cause a vortex to form in the liquid phase of the chemical mixture 211A, as illustrated by the shape of the gas-water interface W in FIG. 2A at impeller 252. The impeller, by generating a vortex, creates a mixture of gas 211B (released from the liquid phase of the chemical composition 211A) and relatively fine liquid droplets. These droplets and the gas are suspended in the vortex region. In one embodiment, the vortex region, or vortex space, is the cone-shaped void that extends beneath the surface W of the liquid. In another embodiment, the vortex space can include the cylindrical volume of the headspace of the container that has a base coinciding with the radius defined by blades of the impeller.

The illustrated example has a venturi 240 with a suction tube that extends into the vortex region, and that draws a mixture of gas and liquid droplets generated by the vortex up and into line 225. From line 225 the mixture enters the delivery hose and is expelled under pressure via control nozzle 230 onto surfaces of the building that is being treated.

Figure 3:
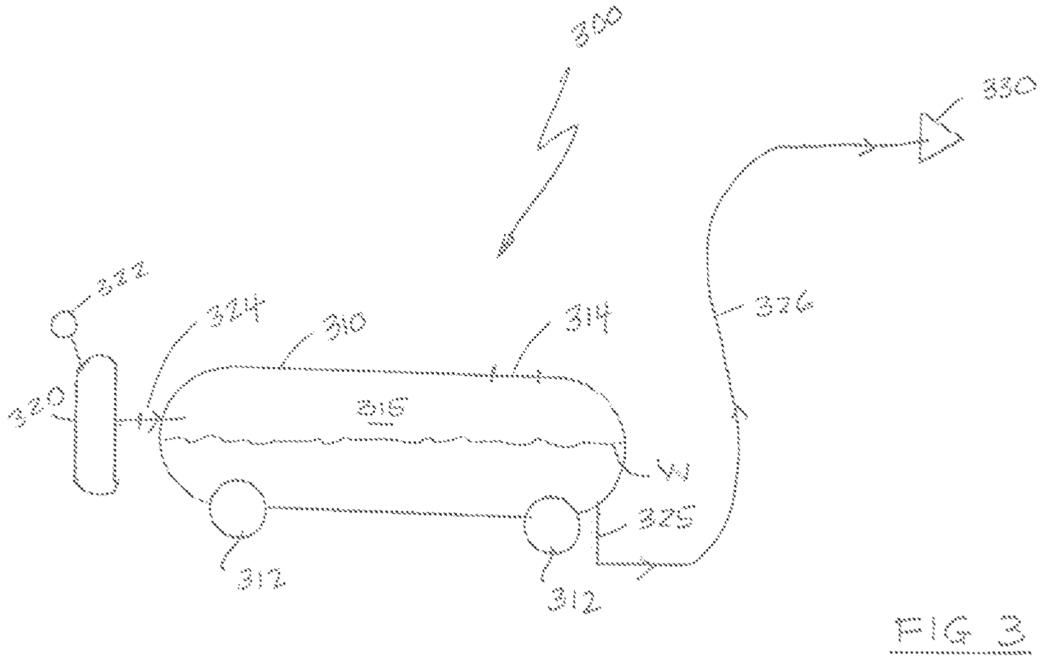
FIG. 3 is a schematic process flow diagram of another exemplary embodiment of the apparatus for remediating floodwater damaged buildings in accordance with an illustrative embodiment.

FIG. 3 illustrates schematically a further embodiment of an apparatus 300 that is useful in the present technology. Here, container 310 is again illustrated as wheeled, for convenience but not necessity, and with a portal 314 to receive the tablet/gel pack. The gas canister 320 that might be clipped onto the container 310 directly supplies pressured gas in line 324 into the headspace 315 above the water-gas interface W. The pressured container allows the chemical composition to exit in line 325 into delivery hose 326 from which it is applied via the control nozzle 330 as a pressured spray onto the surfaces of the building being remediated.

Figure 4:
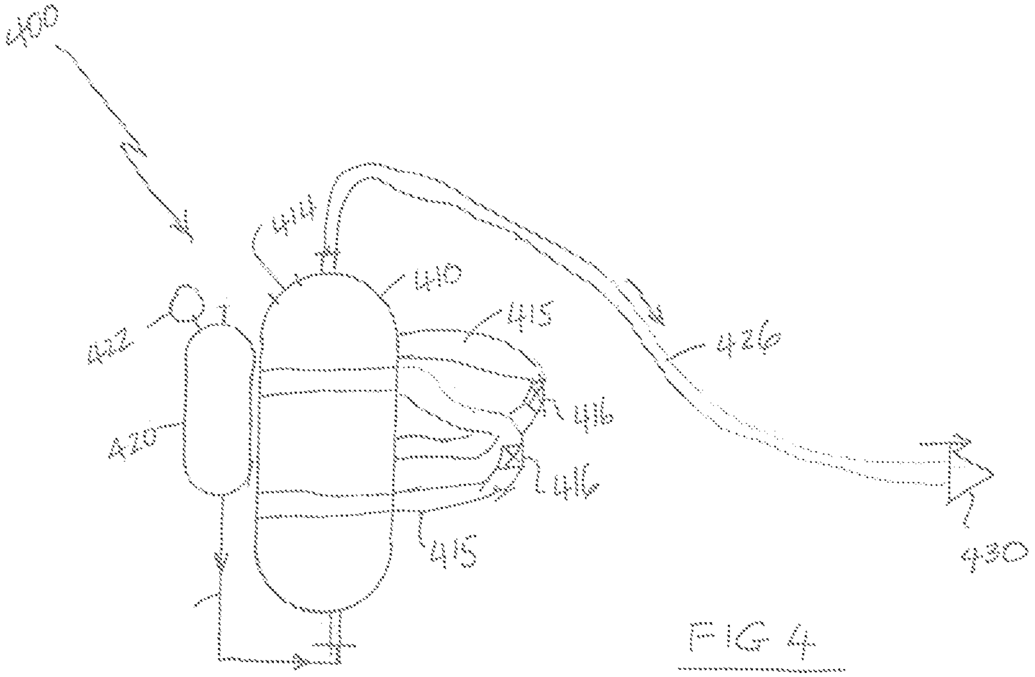
FIG. 4 is a schematic representation of an exemplary backpack version of the apparatus for remediating floodwater damaged buildings in accordance with an illustrative embodiment.

FIG. 4 illustrates schematically a backpack version of an exemplary apparatus 400 that is useful in the present technology. Here, container 410 is illustrated as being attached to an arrangement of straps 415 configured to mount to a back of a person and having interlocking buckles 416 for convenience to secure it in position. There is a portal 414 to receive the tablet/gel pack. The gas canister 420 with pressure gauge 420 may be clipped onto the container 410 directly to supply pressured gas to the container 410. The pressured container allows the chemical composition to exit in delivery hose 426 from which it is applied via the control nozzle 430 as a pressured spray onto the surfaces of the building being remediated.

Figure 5:
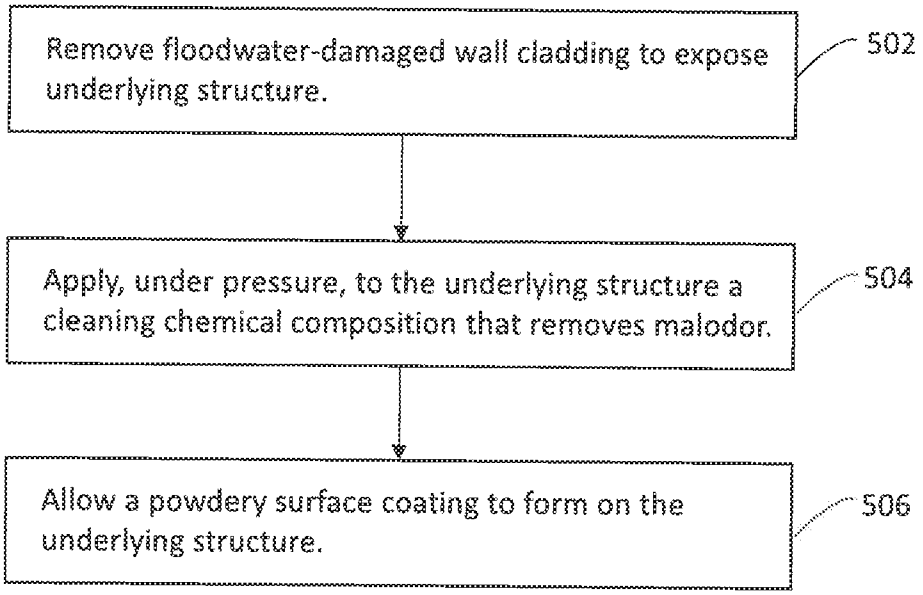
FIG. 5 is a flowchart of a method for remediating buildings damaged by floodwaters in accordance with an illustrative embodiment.

FIG. 5 is a flowchart of a method for remediating buildings damaged by floodwaters in accordance with an illustrative embodiment. In one embodiment, the steps of flowchart 500 can be implemented by a user operating an apparatus for remediating buildings damaged by flood waters as described herein.

Flowchart 500 begins at step 502 by removing floodwater-damaged wall cladding to expose underlying structure. In some embodiments, the step of removing wall cladding comprises removing drywall.

In step 504, a cleaning chemical composition that removes malodor is applied to the underlying structure under pressure. In some embodiments, the cleaning chemical composition comprises an anti-fungal composition. In some embodiments, the cleaning chemical composition comprises chlorine dioxide. In some embodiments, the cleaning chemical composition is applied by applying, under pressure, a spray of chlorine dioxide to the underlying structure. In some embodiments, the cleaning chemical composition is applied by applying, under pressure, a spray of chlorine dioxide and water to the underlying structure. In some embodiments, the chlorine dioxide is generated in situ at the location where a building is to be treated. In some embodiments, the chlorine dioxide is generated and applied in situ at the location where a building is to be treated. In some embodiments, the chemical composition is applied at a pressure in the range between 30 psig to 100 psig, which can cause the chemical composition to penetrate into pores of wooden structures in a building being treated.

In step 506, a powdery surface coating is allowed to form on the underlying structure to which the chemical composition was applied.

Figure 6:
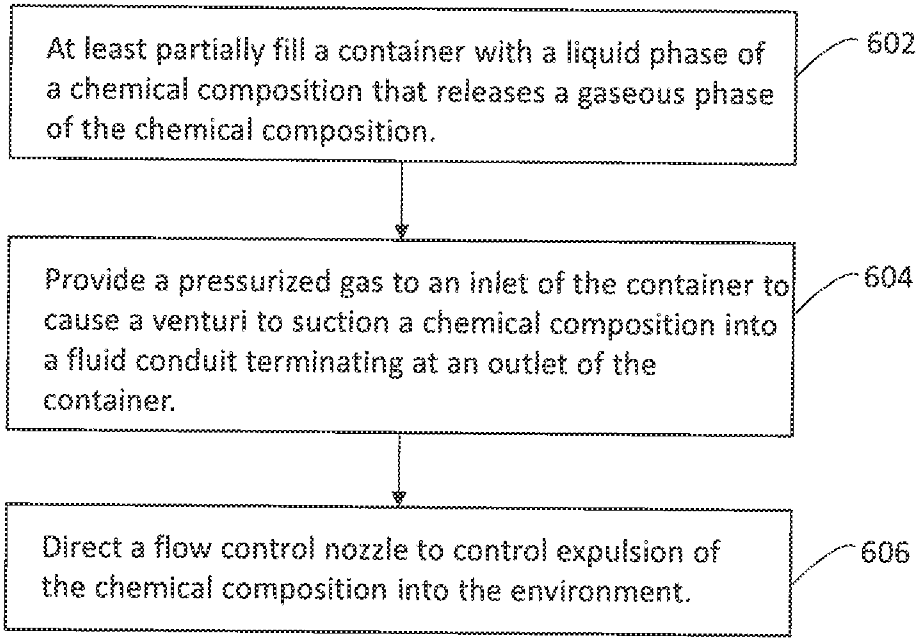
FIG. 6 is a flowchart of another method for remediating buildings damaged by floodwaters in accordance with an illustrative embodiment.

FIG. 6 is a flowchart of another method for remediating buildings damaged by floodwaters in accordance with an illustrative embodiment. In one embodiment, the steps of flowchart 600 can be implemented by a user operating an apparatus for remediating buildings damaged by floodwaters as described herein.

Flowchart 600 begins at step 602 by at least partially filling a container with a liquid phase of a chemical composition that releases a gaseous phase of the chemical composition. In some embodiments, the steps of at least partially filling the container with the liquid phase of the chemical composition includes at least partially filling the container with water and submerging a chemical tablet or a gel cap into the water, which releases the gaseous phase of the chemical composition.

In step 604, a pressurized gas is provided to an inlet of a fluid conduit extending through the container, the fluid conduit including a venturi is disposed in a flowpath of the fluid conduit. The pressurized gas is configured to cause the venturi to suction at least one of the liquid phase of the chemical composition or the gaseous phase of the chemical composition into the fluid conduit for expulsion at the outlet of the container.

In step 606, a flow control nozzle connected to the outlet of the fluid conduit by a hose is directed to control expulsion of the at least one of the liquid phase or the gaseous phase of the chemical composition into an environment. The chemical composition removes malodor from the environment.

In each of the foregoing apparatus, instead of dissolving the tablet or gel pack in the container, the container may be filled with a pre-made solution of the cleaning chemical composition liquid, if that is more convenient.

While examples of embodiments of the technology have been presented and described in text, and some examples also by way of illustration, it will be appreciated that various changes and modifications may be made in the described technology without departing from the scope of the inventions, which are set forth in and only limited by the scope of the appended patent claims, as properly interpreted and construed.

We claim:

1. A method of remediating buildings damaged by floodwaters, the method comprising:

removing floodwater-damaged wall cladding to expose underlying structure;

applying to the underlying structure a pressurized cleaning chemical composition that removes malodor, and allowing a powdery surface coating to form on the underlying structure treated by the pressurized chemical composition.

2. The method of claim 1, wherein the step of removing wall cladding comprises removing drywall.

3. The method of claim 1, wherein the cleaning chemical composition comprises an anti-fungal composition.

4. The method of claim 1, wherein the cleaning chemical composition comprising chlorine dioxide.

5. The method of claim 1, wherein the step of applying includes applying a spray comprising chlorine dioxide.

6. The method of claim 1, wherein the step of applying includes applying a spray comprising chlorine dioxide and water.

7. The method of claim 1, further comprising:

generating chlorine dioxide in situ at a location where a building is to be treated.

8. The method of claim 7, wherein the step of applying the cleaning chemical composition includes applying the chlorine dioxide generated in situ.

9. The method of claim 1, wherein the applying step is carried out at a pressure in a range from about 30 to about 100 psig.

10. The method of claim 1, wherein application of the chemical composition under pressure causes the chemical composition to penetrate into pores of wooden structure in a building being treated.

* * * * *